(12) United States Patent
Lysfjord

(10) Patent No.: US 11,144,738 B2
(45) Date of Patent: Oct. 12, 2021

(54) ENERGY STORAGE MODULE AND METHOD

(71) Applicant: Siemens Aktiengesellschaft, Munich (DE)

(72) Inventor: Ivar Haakon Lysfjord, Inderoey (NO)

(73) Assignee: SIEMENS ENERGY AS, Oslo (NO)

( * ) Notice: Subject to any disclaimer, the term of this patent is extended or adjusted under 35 U.S.C. 154(b) by 0 days.

(21) Appl. No.: 16/959,711

(22) PCT Filed: Dec. 17, 2018

(86) PCT No.: PCT/EP2018/085214
§ 371 (c)(1),
(2) Date: Jul. 2, 2020

(87) PCT Pub. No.: WO2019/134813
PCT Pub. Date: Nov. 7, 2019

(65) Prior Publication Data
US 2021/0089728 A1    Mar. 25, 2021

(30) Foreign Application Priority Data
Jan. 5, 2018  (GB) ..................................... 1800185

(51) Int. Cl.
*G06K 7/08* (2006.01)
*G06K 7/10* (2006.01)
*G06K 19/07* (2006.01)

(52) U.S. Cl.
CPC ..... *G06K 7/10227* (2013.01); *G06K 19/0723* (2013.01)

(58) Field of Classification Search
CPC .................................. G06K 7/10; G06K 19/07
See application file for complete search history.

(56) References Cited

U.S. PATENT DOCUMENTS

| | | | |
|---|---|---|---|
| 7,707,076 B1 | 4/2010 | Whiteley et al. | |
| 8,084,154 B2 * | 12/2011 | Scheucher | H01M 10/6571 |
| | | | 429/62 |
| 9,267,993 B2 | 2/2016 | Farmer et al. | |

(Continued)

FOREIGN PATENT DOCUMENTS

| | | |
|---|---|---|
| EP | 2544331 A2 | 1/2013 |
| EP | 3029800 A1 | 6/2016 |

(Continued)

OTHER PUBLICATIONS

PCT International Search Report and Written Opinion of International Searching Authority dated Feb. 27, 2019 corresponding to PCT International Application No. PCT/EP2018/085214 filed Dec. 17, 2018.

*Primary Examiner* — Thien M Le

(57) ABSTRACT

A DC energy storage module has a plurality of DC energy storage devices electrically connected in series; and a passive or active radio frequency identification tag, or near field communication device located within the energy storage module; wherein the tag or device is configured to be activated from an inactive mode to an active mode in response to an electromagnetic field generated by a transmitter within range of the tag or device; and wherein the tag or device is configured to receive a location dependent identifier from the transmitter.

8 Claims, 2 Drawing Sheets

(56) References Cited

U.S. PATENT DOCUMENTS

| | | | |
|---|---|---|---|
| 2014/0046536 A1* | 2/2014 | Iguchi | G01R 31/382 |
| | | | 701/34.4 |
| 2018/0001843 A1* | 1/2018 | Bowers | B60Q 1/04 |
| 2018/0166677 A1* | 6/2018 | Mortreux | H01M 50/543 |
| 2018/0238697 A1* | 8/2018 | Maru | G01C 21/3453 |
| 2018/0326813 A1* | 11/2018 | Ganiere | B60H 1/00428 |
| 2019/0072615 A1* | 3/2019 | Madeley | H01M 10/4285 |
| 2019/0084425 A1* | 3/2019 | Liu | G05D 1/0088 |

FOREIGN PATENT DOCUMENTS

| | | |
|---|---|---|
| GB | 2404064 A | 1/2005 |
| GB | 2475612 A | 5/2011 |
| GB | 2517535 A | 2/2015 |

* cited by examiner

ENERGY STORAGE MODULE AND METHOD

CROSS REFERENCE TO RELATED APPLICATIONS

This application is the US National Stage of International Application No. PCT/EP2018/085214 filed 17 Dec. 2018, and claims the benefit thereof. The International Application claims the benefit of United Kingdom Application No. GB1800185.9 filed 5 Jan. 2018. All of the applications are incorporated by reference herein in their entirety.

FIELD OF INVENTION

This invention relates to an energy storage module and a system and method for activating a wireless transceiver in an energy storage module, in particular for modules comprising an electrochemical cell, or battery, providing electrical energy to an end user.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In some countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether hybrid, or fully electric, the stored energy units may be charged from a shore supply when docked. The development of technology to achieve stored energy units that are reliable enough for prolonged use as the primary power source must address certain technical issues.

SUMMARY OF INVENTION

In accordance with a first aspect of the present invention, a DC energy storage module comprises a plurality of DC energy storage devices electrically connected in series; and a passive or active radio frequency identification (RFID) tag, or near field communication (NFC) device located within the energy storage module; wherein the tag or device is configured to be activated from an inactive mode to an active mode in response to an electromagnetic field generated by a transmitter within range of the tag or device; and wherein the tag or device is configured to receive a location dependent identifier from the transmitter.

Advantageously, the location specific identifier is defined by the identity of the cabinet and the position of the energy storage module within the cabinet relative to other energy storage modules in the same cabinet.

Advantageously, the total voltage of the plurality of DC energy storage devices in series is greater than or equal to 78 V DC.

Each DC energy storage device of the plurality of DC energy storage devices may comprise either a single DC energy storage device, or a group of DC energy storage devices electrically connected together in parallel.

In accordance with a second aspect of the present invention, a method of allocating an identifier to a DC energy storage module within a cabinet of a DC energy storage system, the module comprising a plurality of DC energy storage devices electrically connected together in series, the method comprising installing a DC energy storage module at a predetermined location in the cabinet; sending an activation signal to activate an RFID tag, or NFC device in the module by applying an electromagnetic field, generated in a transmitter, to the tag or device; and transmitting a location specific identifier to the activated tag or device.

Advantageously, the location specific identifier is defined by the identity of the cabinet and the position of the energy storage module within the cabinet relative to other energy storage modules in the same cabinet.

Advantageously, the activation signal comprises specific parameters to indicate a valid signal, without which the tag or device does not respond.

In accordance with a third aspect of the present invention, a method of maintaining an energy storage system comprising a plurality of energy storage modules, the method comprising removing one or more energy storage modules from the system; replacing the or each removed module with a replacement module, each replacement module being identical and anonymous; and allocating an identifier to each replacement energy storage module in accordance with the second aspect.

BRIEF DESCRIPTION OF THE DRAWINGS

An example of a system and method according to the present invention will now be described with reference to the accompany drawings in which.

DETAILED DESCRIPTION OF INVENTION

Figure 1:
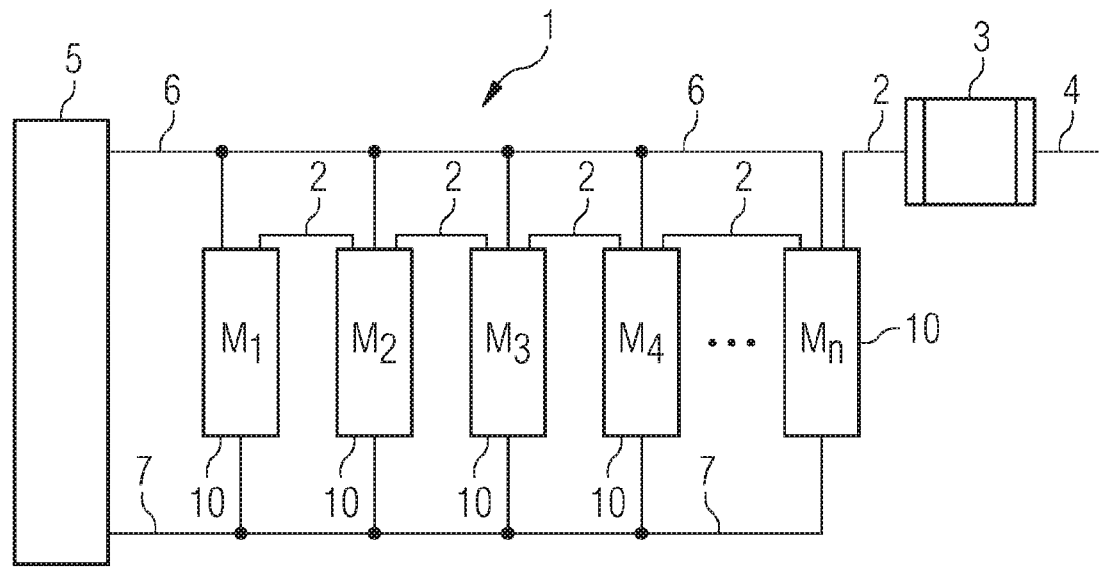
FIG. 1 is a block diagram illustrating an example of a modular energy storage system in which the system and method of the present invention may be applied.

Early large scale batteries were lead acid, but more recently, lithium ion batteries have been developed for electrical energy storage for large scale applications. Li-ion batteries are typically pressurised and the electrolyte is flammable, so they require care in use and storage. A problem which may occur with Li-ion batteries is thermal runaway which may be caused by an internal short circuit in a battery cell, created during manufacture. Other causes, such as mechanical damage, overcharge, or uncontrolled current may also cause thermal runaway, but the battery system design is typically adapted to avoid these. Manufacturing issues with the cells cannot be ruled out entirely, so precautions are required to minimise the effect should thermal runaway occur. In a large scale Li-ion battery system, the amount of energy that is released during a thermal runaway is a challenge to contain. A thermal event may increase temperatures in a single cell from a standard operating temperature in the range of 20° C. to 26° C. to as much as 700° C. to 1000° C. Safe operating temperatures are below 60° C., so this is a significant problem.

There are strict regulations in the marine and offshore industries regarding risk to the vessel or rig, one requirement being that there should be no transfer of excess temperature from one cell to another. If overheating occurs, then it should be contained in a single cell and not allowed to spread. In addition, for marine and offshore applications, weight and volume of any equipment is severely restricted, leading to compact, lightweight systems being preferred. It is a challenge to produce a compact, lightweight, system that achieves the required thermal isolation and cools the cell in which excess heating occurs, quickly and efficiently.

In a Li-ion battery system, it is very important that the temperature of the battery cells does not exceed the prescribed operating temperature and that the cell temperature in the entire system is uniform. Sustained operation outside the prescribed operating temperature window may severely affect the lifetime of the battery cells and increases the risk of thermal runaway occurring.

For marine applications, there is a particular focus on using energy storage modules, such as batteries, at their maximum charge or discharge rate due to cost of installation and the weight and space taken up by the modules when on a vessel or offshore platform. Furthermore, maintenance and repair, or replacement is complicated and expensive compared to land based uses of stored energy systems, so extending the lifespan of stored energy modules is particularly important. For the example of Li-ion batteries, these are sensitive to high temperature, so it is important to ensure that the operating and ambient temperature are controlled for all cells of a Li-ion battery system to ensure the design lifetime is met. Local variations or hot spots on a single cell may also compromise the total lifetime achievable.

Energy storage systems for supplying DC electrical energy for marine applications, such as systems onboard vessels and offshore platforms, have high voltage and current requirements. They may need to provide voltage levels of 1 KV DC, or higher, which are achieved by combining multiple energy storage modules operating at voltages between 50V DC and 200V DC, for example 78V DC, or 100V DC. Although the energy storage module cooling systems are fluidly connected in parallel, the energy storage modules are electrically connected together in series. Each module may comprise a plurality of energy storage devices, such as battery cells, connected together in series to provide the required total module voltage. Typically, this is of the order of 100V to 150V DC, using energy storage devices each rated at between 3V and 12V. For example, each battery cell may only have a voltage of the order of 3V, for example, for Li-ion, the nominal voltage is about 3.65V, but in a module having twenty eight cells, electrically connected together in series, this results in a voltage closer to 100V, typically in the range 78 V to 118V. Multiple modules may be coupled together to be able to provide sufficient DC voltage to power systems on the vessel, for example, 1 KV or more. This requires special care when an operator is working on the cabinet, as the cabinet is at a relatively high potential compared to ground.

As illustrated in FIG. 1, the system typically comprises a plurality of energy storage modules $M_1$ to $M_n$, electrically connected together in series by DC bus 2 to provide the voltage level required by the system. Each module of the energy storage system incorporates a plurality of energy storage devices (not shown). The DC energy storage devices may comprise individual energy storage devices, or may comprise a plurality of energy storage devices in parallel, which are then connected together in series with another energy storage device, either an individual energy storage device, or a group of energy storage devices in parallel. Within the energy storage system 1, each module 10 may be connected via the DC bus 2 to a main system DC bus and a central controller 3, which may set limits for example for charging rate and state of charge of each module 10, as well as controlling the supply to consumers (not shown) on the main DC bus 4. The central controller 3 determines which modules 10 to charge or discharge, according to the requirements of the vessel and the available stored energy in each module and controls supply of power to the vessel DC bus 4. There may be a converter (not shown) between each energy storage module and the DC bus 2 of the energy supply system, in particular in the case where there are multiple energy storage modules connected. Although the energy storage devices of the energy storage modules may be cooled by air cooling, preferably, the energy storage modules are cooled in a closed cooling system comprising a cooling unit 5 supplying cooling fluid in parallel to each module via inlet pipes 6 to each module and receiving cooling fluid returned to be cooled again via outlet pipes 7.

Figure 2:
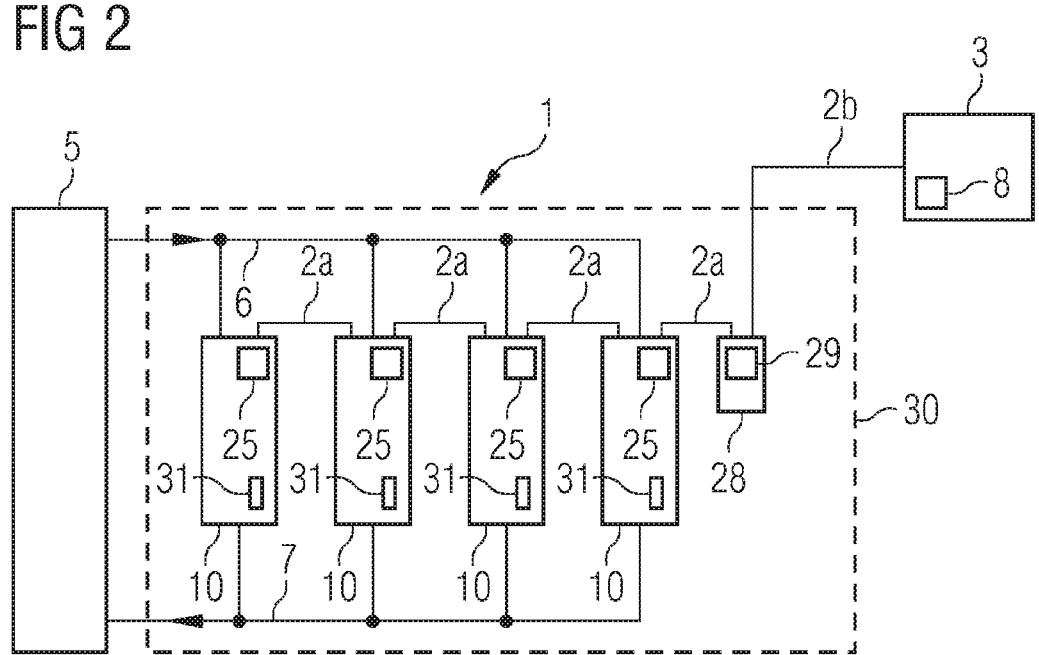
FIG. 2 is a block diagram illustrating a wireless communication system which may be used in the system and method of the present invention.

As illustrated in FIG. 2, each of the modules may comprise a wireless transceiver 25 by which the modules 10 may communicate with a unit controller 28, or directly with a system power controller 3 of the vessel, allowing the controller to determine which modules to charge or discharge, according to the requirements of the vessel and the available stored energy. The system power controller 3 controls transmission of power between a DC bus 2b of the energy storage system and the vessel DC bus. Typically, a plurality of modules 10 are connected together in series by an internal bus 2a which then connects the modules 10 in the system to gateways 29 in each unit 1, for example, a cabinet, or cubicle, as can be seen in more detail in FIG. 3. The gateway connects the modules to the system bus 2b. The cubicle controller 28 may have some decision making capability and may also communicate with the system controller 3. System controller 3 sets limits for the battery system, such as charge and discharge levels, as well as determining load balancing. The system controller 3 may control an optional converter on the bus. Although the energy storage devices of the energy storage modules 10 may be cooled by air cooling, preferably, the energy storage modules are cooled in a closed cooling system comprising a cooling unit 5 supplying cooling fluid via inlet pipes 6 to each module and receiving cooling fluid returned to be cooled again via outlet pipes 7. The cooling fluid may be supplied to all the modules in parallel and to all energy storage devices of each module in parallel.

For ease of manufacture and repair, all energy storage modules 10 are substantially identical when manufactured, but need to be given an individual identifier (ID) during commissioning. This ID is necessary so that the module transceiver 25 connects to the correct wireless network, as well as giving the proper ID for the location of that module in the series of modules within a cabinet 30. A cabinet typically comprises a plurality of energy storage modules electrically connected together in series by DC bus 2, together with associated parallel cooling channels 6. Within a battery room, there may be dozens of cabinets 30, each with multiple modules 10 that need to be controlled, to provide power, or to be charged, as efficiently as possible.

In view of the relatively high voltage potential inside the cabinet 30, the electronics may either be galvanicly insulated from the battery cell string 21 through a switch, or an insulated electrical link may be used to protect the operator from electrical shock when connecting to the modules to allocate their ID. Due to the high voltage potential, such switches and insulated electrical links are large and add size and cost to the design. Instead of a switch to turn off the electronics completely, the electronics is set in to an inactive, low power, or sleep, mode. To be able to turn the electronics on, a signal is needed to activate the electronic devices. Although the activation signal could be delivered through a pushbutton, the pushbutton would need a very high voltage insulation, of the order of 1000 V, meaning a large and expensive pushbutton. In addition, such a pushbutton may also inadvertently be activated during transit, leading to false wake ups, which again may lead to depletion of the cells.

These issues may be addressed by the design of the present invention. Identical battery modules 10 are manufactured and each incorporates a wireless device 31 of some type, such as a radio frequency identification (RFID) tag, in particular, a near field communication (NFC) slave device. The tag or slave device is typically powered by an electromagnetic field from a reader which is brought into close proximity with the tag or slave device, of the order of 1 m to 2 m is a typical operating distance for some RFID tags, whereas NFC slave devices require the reader to be less than 0.1 m away. The advantage of the short range of NFC compared to other RFID protocols that operate at a longer range is that it is unlikely that communication with the wrong module will occur when setting the ID, as the next module along is likely to be too far away. However, with care, other RFID protocols can be used. A passive RFID tag or NFC slave device is able to receive a signal from the reader and respond to the reader or master, although they cannot communicate with other passive devices. Certain devices may also be written to by the reader. Active devices have these characteristics and can also transmit a signal onwards to other NFC devices within the module. The device or tag may also be chosen to be a bus (I2C) device able to be connected by a wired connection to other electronics units in the module and communicate with those units in that way.

The electronics module, including the tags, or slave devices, within their modules, are kept in an inactive mode, or sleep mode during storage and transportation. In sleep mode, or when switched off, the wireless communication and measurement circuits of each module are not active. This prevents the battery cells within the module being depleted by operation of the wireless communication and measurement circuits, which may damage the cells. If Li-ion cells are depleted, they can no longer be recharged, but are permanently damaged, whereas with lead acid cells, the cell can simply be recharged. The electronics inside the module are powered from the module. In normal operation the power used by the electronics gives about 6 months operation without recharge before they are depleted, whereas in sleep mode the current consumption may be so low that it would take about 18 years to become depleted. As the modules may be stored for many months from the date of production before being installed and charged again, it is important to avoid depletion during this period.

In a wireless system, for example, as referred to above with respect to FIG. 2, the only electrical connections provided in each module 10 are high voltage power connections, to connect each module 10 to its neighbour within the cabinet 30, via DC bus 2a. The modules are sealed to ensure that gases produced in operation are vented in a controlled manner through a vent and to prevent users coming into contact with high voltage parts, so the modules cannot be opened for other types of connection, even on a temporary basis. If the modules were externally powered, during transit all electronics would be switched off to avoid depletion of the cells, but once installed and connected to the external power source, the module would wake up. However, this would require additional electrical connections and an additional power source which is expensive and complex due to the high voltage potential. Avoiding this additional cost and complexity is desirable. In the present invention, all communication to and from the module 10 is wireless. In order to wake each module from sleep mode, or switch on the module, there needs to be an interaction with the module transceiver of each module, once the module has been mounted in the cabinet, and is otherwise ready for use. As discussed above, the high electrical potential of the system 1 requires that the interaction is done without the operator being put at risk of electric shock.

Thus, wireless near field communication (NFC), or radio frequency identification (RFID), may be used to both wake up the module 10 once installed and to set the module ID. By using this type of wireless communication to the module 10, the module is given an ID that is correct for its location within the cabinet 30 and the system. Once allocated, this unique ID applies for the module at this location in the cabinet. This is preferable to having each module pre-programmed with its ID in the factory because there is no need for the operator to have to consider whether the correct module is being assembled in the correct location. Instead, a module 10 is simply taken from those delivered and put in place at a particular location within the system. The location determines what ID it should take and that ID is applied as part of the commissioning process. This simplifies installation and repair and avoids operator errors, which may happen, even with clearly labelled units. To repair the system, if a module fails, the module is removed, a new module with no individual identifier is put into the space and then the ID for that space is given to the new module.

Figure 3:
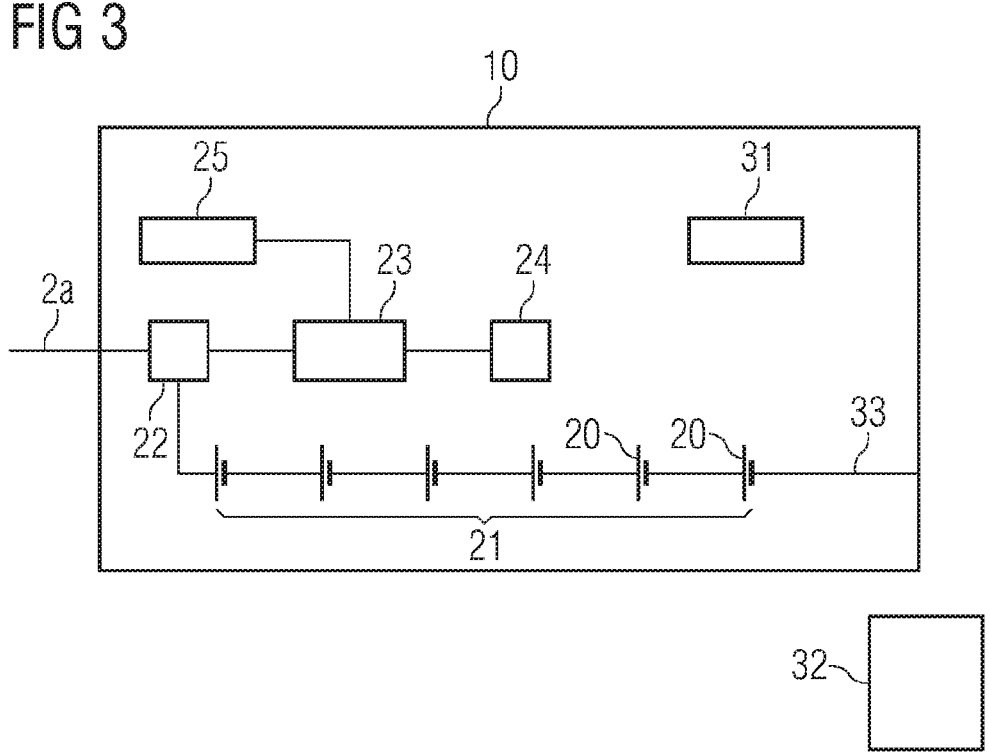
FIG. 3 is a block diagram illustrating a module incorporating the system and method of the present invention; and, FIG. 4 is a flow diagram illustrating an example of carrying out a method according to the present invention.

FIG. 3 illustrates some of the electronic circuitry within each module 10. A regulator 22 may couple each of the energy storage modules to the internal DC bus 2a, or the energy storage devices may be directly connected. Within each energy storage module, a local control unit 23 may be provided with control and monitoring circuitry for such purposes as performing cell balancing, temperature measurement and cell voltage monitoring. The local control unit 23 may receive data from sensors 24, such as temperature measurements, or data from each of the energy storage devices 20, such as voltage measurements, that data may be used locally, for example, for cell balancing. Some or all of the data collected locally may need to be supplied to the unit controller 28 or the central power system controller 3 on the vessel or platform, which controls the allocation of power from each energy storage module to main systems, such as the propulsion system, or drilling equipment. The negative potential of the final energy storage device 20 is connected 33 to the next module (not shown). The chassis of each module is connected to ground for safety reasons.

Activating, or waking up, the active or passive RFID tag, or NFC device, begins the process whereby the module may receive and transmit data to the unit controller or a system controller. It is preferable, that this wake up only takes place once the module is located in its cabinet and there is a circuit to charge and discharge the cells in the module. Up to that point, current drawn by any of the electronic circuitry from the cells is very small, preventing damage during transit or storage. The activation of the tag or device 31 is carried out by bringing a reader or master 32 within range, as illustrated in FIG. 3, then transmitting an electromagnetic field from the reader or master, to power up the tag or device. Once powered up, the tag may be allocated its own identifier. RFID or NFC devices communicate using an electromagnetic field, and this field has enough electrical power to power up the RFID tag, or slave device within the module 10. After the wake-up, the RFID tag, or NFC slave device, may send a signal to wake up the electronics, for example a microcontroller which wakes up measurement and communication circuits, within the module. Certain parameters for the near field communication may be set, so that the module only wakes up if it receives a valid NFC communication which complies with the pre-set parameters password/code, or checking that the data sent has correct properties, such as the amount of data is the amount expected. This avoids false wake ups occurring simply due to the device or slave coming within range of any RFID or NFC signal, rather than a signal specifically intended for that device or slave. Having successfully, woken up the module, the reader/master may provide the module with its unique ID, so that the module connects to and communicates with the correct network. Provision of the ID may be simultaneous with the wake-up communication, or may take place after the module has woken up. The NFC device may generate the ID, or an external device, such as a timer may generate the ID.

As RFID, or NFC are short range communication methods, then the operator waking up the device and setting the ID needs to be in close proximity with the device, or slave, to be able to perform the task correctly, but is able to carry out this activity with a contactless method, so improving safety. The range for NFC devices is typically up to about 1 cm to 3 cm, although it may be greater with certain RFID protocols. The short operating range makes the risk of interacting with the wrong module very low, similarly, the risk of false wake ups, or other interference. This may be reduced to substantially zero in conjunction with insulating material between the high voltage potential and the operator. The RFID communication, or NFC communication, may be password protected, so as to provide more secure communication. The present invention provides a solution to the problem of allocating an individual identifier to otherwise identical modules, as well as allowing the module to be safely initialised despite the possibility of high voltage on the cabinet in which the module is mounted, in case of a fault, by avoiding physical contact between the operator and the high voltage part of the cabinet.

Figure 4:
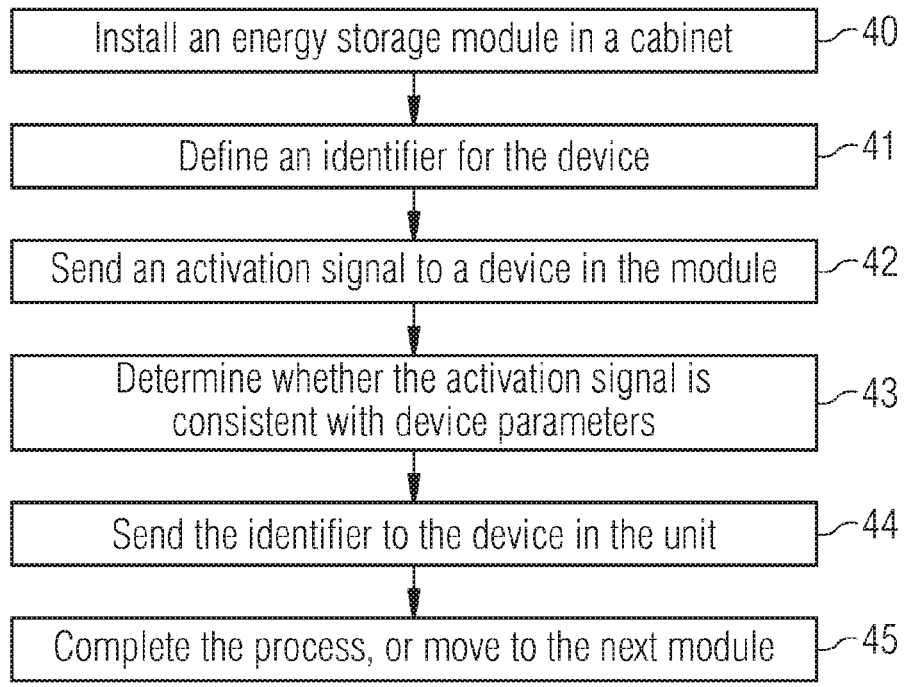

FIG. 4 illustrates an example of a method according to the present invention. An energy storage module 10, for example a DC energy storage module comprising a plurality of DC energy storage devices electrically connected in series is installed 40 in a cabinet 30. The module comprises a passive, or an active radio frequency identification (RFID) tag, or a passive, or active, near field communication (NFC) device. An identifier is defined 41 in the reader or master 32, for the device 31 and typically, the location specific identifier is defined by the identity of the cabinet and the position of the energy storage module within the cabinet, relative to other energy storage modules in the same cabinet. An activation signal is sent 42, typically from a reader, or master device 32, to the tag or device 31 in the module 10 and the tag or device is configured to be activated in response to the activation signal. As the tag or device is transported in a reduced power, or low power mode, also known as sleep mode, this activation signal activates the energy storage module from its low power mode to an active mode in which it can carry out measurements, communication or other tasks. The activation signal comprises an electromagnetic field generated by the reader or master device. The reader or master device must be within range of the tag or slave device in order to cause activation. The activation signal may comprise specific parameters to indicate a valid signal, without which the tag or device does not respond. The tag or slave device determines 43 whether the activation signal is consistent with parameters set in the tag or device, which prevent a wake up occurring in error. If the activation signal is consistent, then either in combination with the activation signal, or thereafter, an individual identifier is provided to the tag or slave device. This identifier is sent 44 and the tag or device is configured to receive the location dependent identifier from the transmitter and use this identifier in all subsequent communications with the unit controller, or system controller. When the identifier has been sent, the operative may move on to the next module, if the process has not been completed 45 for all modules in a cabinet.

The solution of the present invention reduces cost and size as compared to using specialised switches or a galvanic insulated electrical link, which are far more expensive and bulky, as well as adding time in the production process. By setting up the device or slave to only respond to a valid communication, determined by predefined parameters, false wake ups and false/incorrect ID settings are prevented. Maintenance of an energy storage system comprising a plurality of energy storage modules is simplified by being able to simply remove one or more energy storage modules from the system; replace the removed modules with replacement modules, each replacement module being identical and anonymous; and then allocating an identifier to each replacement energy storage module, once the replacement module is in place. The identifier allocated to the replacement module may, for example, be the exactly the same as the identifier of the removed module, or may differ only to the extent of indicating that it is a replacement, but otherwise giving the same information about location within a cabinet.

Although the detailed examples have been given with respect to electrochemical cells, such as batteries, for example Li-ion, alkaline, or NiMh batteries, or others, the invention applies to other types of stored energy units, in particular non-cylindrical capacitors, ultracapacitors, or supercapacitors, fuel cells, or other types of energy storage which have a surface that can be cooled by a cooler and which may also suffer if the temperature of modules of the stored energy units regularly goes outside a preferred operating range, reducing the overall lifetime.

The invention claimed is:

1. A method of allocating an identifier to a direct current DC energy storage module within a cabinet of a DC energy storage system, the module comprising a plurality of DC energy storage devices electrically connected together in series, the method comprising:

installing a DC energy storage module at a predetermined location in the cabinet;

sending an activation signal, following the installing step to activate a radio frequency identification (RFID) tag, or near field communication (NFC) device in the module by applying an electromagnetic field, generated in a transmitter, to the RFID tag or the NFC device; and transmitting a unique location specific identifier to the activated RFID tag or the activated NFC device, the location specific identifier identifying the location of the DC energy storage module following the installing step.

2. The method according to claim 1, wherein the location specific identifier is defined by the identity of the cabinet and the position of the energy storage module within the cabinet relative to other energy storage modules in the same cabinet.

3. The method according to claim 1, wherein the activation signal comprises specific parameters to indicate a valid signal, without which the RFID tag or the NFC device does not respond.

4. A method of maintaining an energy storage system comprising a plurality of energy storage modules, the method comprising:

removing one or more energy storage modules from the system;

replacing the or each removed module with a replacement module, each replacement module being identical and anonymous; and allocating an identifier to each replacement energy storage module in accordance with the method of allocating the identifier in claim 1.

5. A direct current DC energy storage module, comprising:

a plurality of DC energy storage devices electrically connected to one another in series to define an energy storage module installed in an operating position; and a passive or active radio frequency identification (RFID) tag, or near field communication (NFC) device located within the energy storage module;

wherein the RFID tag or the NFC device is configured to be activated from an inactive mode to an active mode while in the operating position and in response to an electromagnetic field generated by a transmitter within range of the RFID tag or the NFC device; and wherein the RFID tag or the NFC device is configured to receive a unique location specific identifier from the transmitter, the location specific identifier at least partially corresponding to the operating position.

6. The module according to claim 5, wherein the unique location specific identifier is defined by the identity of a cabinet and the position of the energy storage module within the cabinet relative to other energy storage modules in the same cabinet.

7. The module according to claim 5, wherein a total voltage of the plurality of DC energy storage devices in series is greater than or equal to 78 V DC.

8. The module according to claim 5, wherein each DC energy storage device of the plurality of DC energy storage devices comprises either a single DC energy storage device, or a group of DC energy storage devices electrically connected together in parallel.

* * * * *